ated June 29, 1971

United States Patent

[11] 3,589,189

| [72] | Inventor | Robert R. Douglas |
| | | Philadelphia, Pa. |
| [21] | Appl. No. | 847,984 |
| [22] | Filed | Aug. 6, 1969 |
| [45] | Patented | June 29, 1971 |
| [73] | Assignee | The Singer Company |

[54] RECIPROCATING VALVE ACTUATING MECHANISM FOR DIAPHRAGM GAS METERS
14 Claims, 12 Drawing Figs.

[52] U.S. Cl. .................................................. 73/268
[51] Int. Cl. ................................................... G01f 3/22
[50] Field of Search ........................................ 73/262, 263, 264, 268, 269; 74/596

[56] References Cited
UNITED STATES PATENTS

| 991,927 | 5/1911 | Armstrong | 73/268 |
| 2,663,189 | 12/1953 | Butterworth | 73/268 |
| 2,741,122 | 4/1956 | Douglas | 73/268 |
| 2,800,810 | 7/1957 | Bancel | 74/296 |
| 3,415,121 | 12/1968 | Douglas | 73/264 |

FOREIGN PATENTS

| 421,081 | 12/1934 | Great Britain | 73/268 |

Primary Examiner—Richard C. Queisser
Assistant Examiner—C. E. Snee, III
Attorneys—Marshall J. Breen, Chester A. Williams, Jr. and Harold Weinstein ABSTRACT: A diaphragm-type gas meter with a plurality of measuring chambers above which is connected on one side thereof a pair of slide valves, operated by a valve-actuating mechanism pivotally connected to a single throw crank in a manner which advances the valve timing to permit greater accuracy at higher volumes of flow. The housing has flat sides and a register is disposed therein on the side opposite the valve and valve-actuating mechanism, whereby a compact gas meter is obtained.

ROBERT R. DOUGLAS
INVENTOR.

BY Harold Weinstein

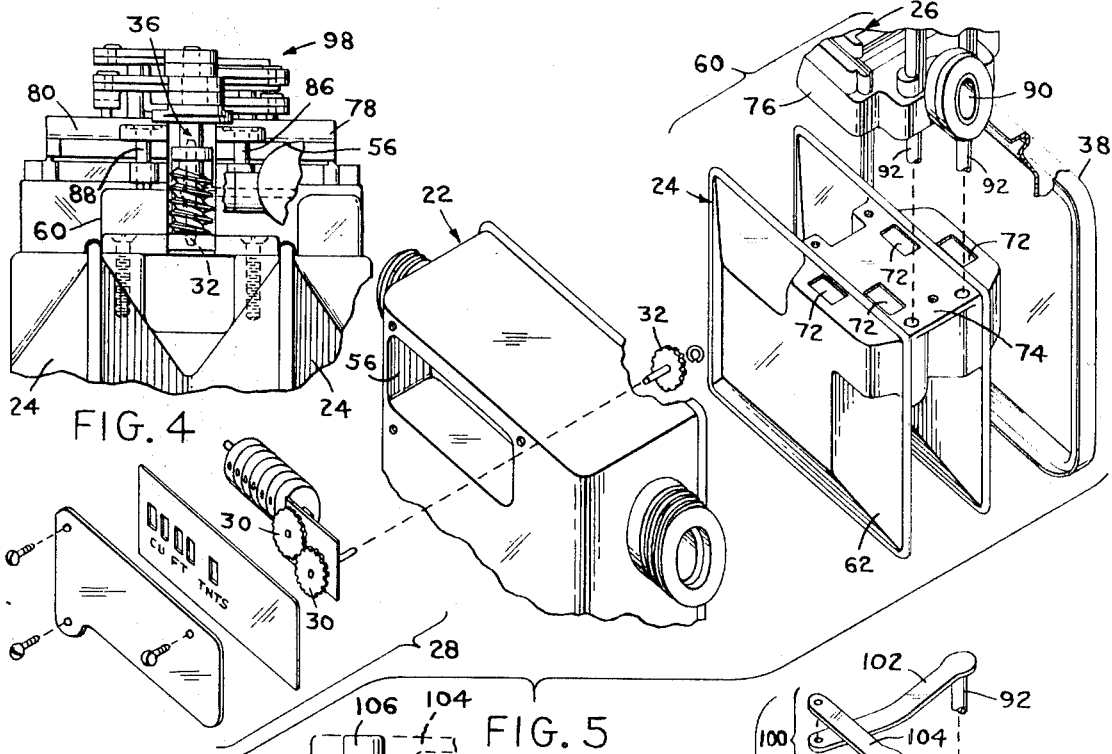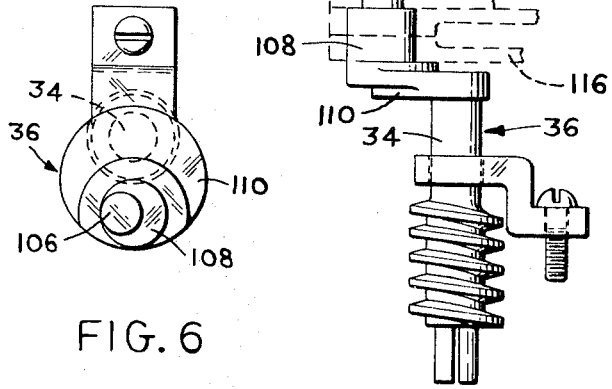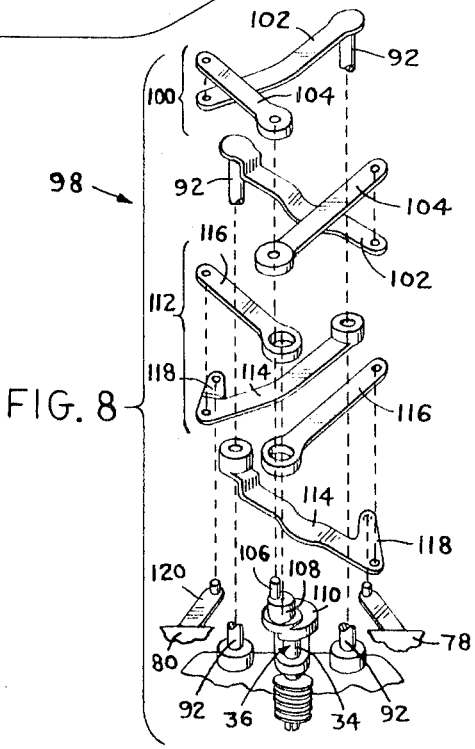

ROBERT R. DOUGLAS
INVENTOR.

BY Harold Weinstein

RECIPROCATING VALVE ACTUATING MECHANISM FOR DIAPHRAGM GAS METERS

BACKGROUND OF THE INVENTION

Gas meters of the prior art have used symmetrical configurations so that the valve and actuating mechanism completely fill the space in housing above the measuring chambers, thus requiring the register to project outwardly from the side or top of the meter. Also, the conventional meter used adjustable tangents for the valve timing and this required a double throw crank arrangement.

SUMMARY OF THE INVENTION

In accordance with the present invention, the novel gas meter includes a housing having an inlet and an outlet passage. A plurality of measuring chambers are formed within the housing. A plurality of valves in the housing connect the measuring chambers to the inlet and the outlet passages. A register indicates the quantity of gas passing through the meter. A valve-actuating means is operatively connected to each of the valves and comprises a linkage mechanism and a crank. The linkage mechanism is operatively actuated by the measuring chambers. The crank is journaled in the housing and connected to be actuated by the linkage mechanism. The crank has a single throw, and has a predetermined spaced relationship between the respective connections thereto of the linkage mechanism between the measuring chambers and the valves whereby the valve timing is advanced to permit greater accuracy at increased rates of flow.

It is therefore an object of the present invention to provide an improved gas meter which overcomes the prior art disadvantages; which is simple, economical, reliable and compact; which uses a valve-actuating means capable of advancing the timing; which uses a single throw crank in association with the valve-actuating mechanism; which has the valves and valve-actuating mechanism mounted on one side of the housing and the register mounted on the other side thereof, to produce a compact arrangement; which includes a subassembly of the measuring chambers and valve means which is substantially "L"-shaped; which uses a two-section crank pin to advance the valve timing; which uses crossed over links to obtain a compact arrangement of the valve-actuating means; and, which valve-actuating means includes separate pairs of linkage means, each pair substantially equal in length but offset from each other at the crank connect thereof to obtain the valve timing advance.

Other objects and advantages will be apparent from the following description of several embodiments of the invention and the novel features will be particularly pointed out hereinafter in the claims.

BRIEF DESCRIPTION OF THE DRAWINGS

This invention is illustrated in the accompanying drawings in which:

FIG. 4 is a view taken along line 4—4 of FIG. 1.

FIG. 5 is a fragmentary perspective view of the gas meter.

FIG. 6 is a top plan view of the crank and crank mounting bracket.

FIG. 7 is a front elevational view of the crank and the crank mounting bracket.

FIG. 8 is an exploded perspective view of valve actuating mechanism.

DESCRIPTION OF THE INVENTION

Figure 1:
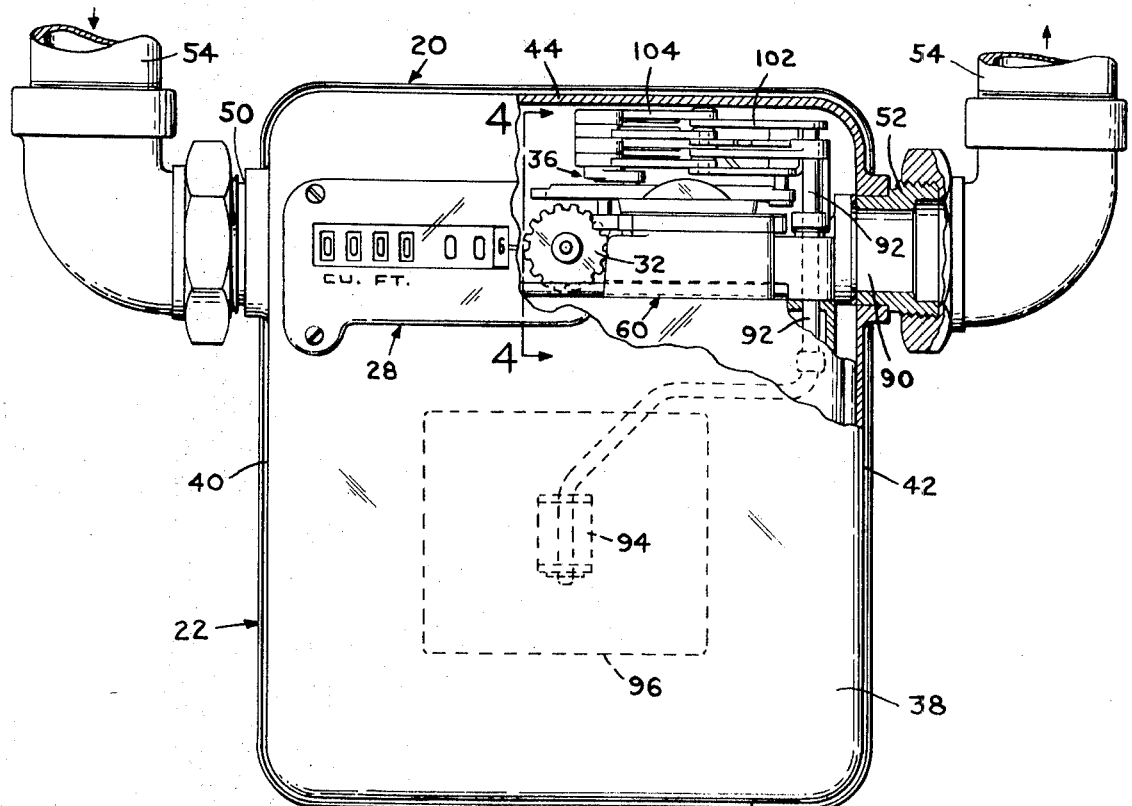
FIG. 1 is a front elevational view partly in section of a gas meter embodying a preferred form of the present invention.
Figure 2:
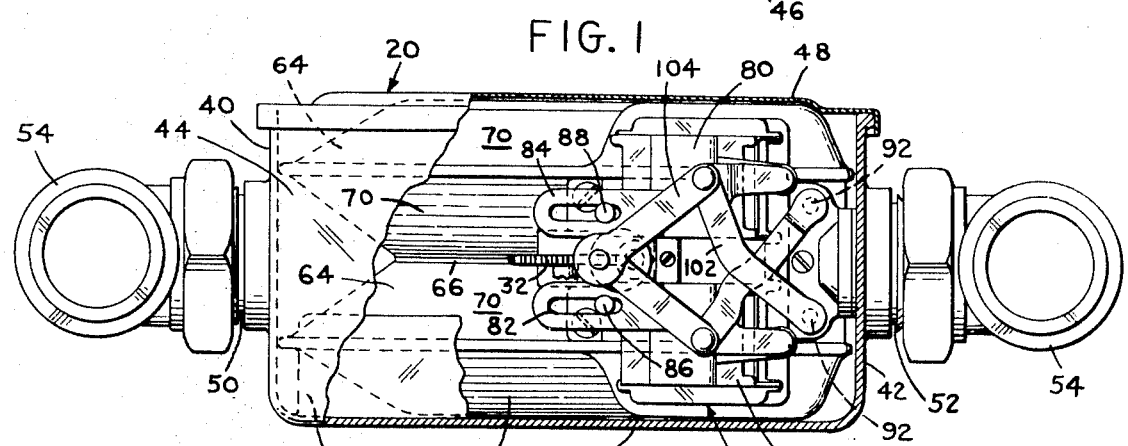
FIG. 2 is a top plan view partly in section of the gas meter of FIG. 1.

In the embodiment of the invention illustrated in FIGS. 1—10 the gas meter, designated generally as 20, is depicted as a diaphragm-type for illustrative purposes only. The gas meter 20 includes a housing 22 into which is disposed a plurality of measuring chambers 24 atop one side of which is a valve means 26 connected to be actuated by the measuring chambers 24 in a predetermined sequence as more fully explained hereinafter. A register 28 is driven through a pair of change gears 30 and a pinion gear 32 by a shaft 34 of a crank 36 which in turn, is actuated by the valve means 26, as illustrated in FIGS. 1, 2 and 5.

The housing 22 shown in FIGS. 1—5 has a flat front 38, the outer edges of which are turned perpendicular to form vertical sides 40 and 42 and horizontal top 44 and bottom 46, respectively, which members terminate in a plane parallel to the front 38, so as to define a hollow interior with an open back. A cover 48 is detachably secured to close the back of the housing 22. The side 40 has a integral inlet fitting 50, leading into the interior of the housing 22 and the side 42 has an integral outlet fitting 52 for respective connection of the inlet 50 and outlet 52 of the gas meter 20 into a gas line designated generally as 54. A register recess 56, best seen in FIG. 5, is formed in the upper left-hand side of the front 38 for mounting of the register substantially within the plane of the front 38 in a manner which eliminates the outward projection thereof.

Figure 3:
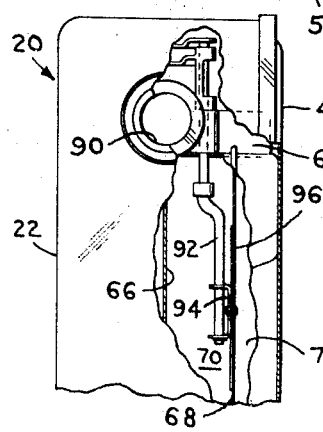
FIG. 3 is a side elevational view looking into the outlet, and partly broken away showing one of the flag rod operatively connected to the support plate of the diaphragm.

The measuring chambers 24 and the valve means 26 connected thereto form a subassembly 60, as shown in FIGS. 1—5. The measuring chambers 24 are enclosed within a casing 62 and are divided into twin compartments 64 by a vertical partition 66. Each of the compartments are substantially pan-shaped and further divided by a diaphragm 68 into substantially equal measuring chamber portions 70, as best seen in FIGS. 2 and 3, to define four substantially equal measuring chambers within casing 62. A separate port 72 communicates with each of the chamber portions 70, and is formed in the flattened top surface 74 of the casing 62 as illustrated in FIG. 5.

The valve means 26 includes a pair of three port slide valves having a valve plate 76 and its associated transfer valve members 78 and 80 slidably disposed thereon to be affixed to the surface 74 in sealing engagement therewith to place the valve means 26 in alignment with the port 72 whereby the measuring chambers 24 will be alternately placed in communication with the inlet 50 and the outlet 52 in a predetermined operative sequence. The valve members 78 and 80 have integrally formed slotted arms 82 and 84 which receive guide pins 86 and 88 fixed in the top of the valve plate 76. The valve plate 76 has a central outlet passage 90 with perpendicular legs extending in either direction under a domed midportion of the transfer valve members 78 and 80 so as to alternately communicate one or the other of the pairs of ports 72 with the outlet passage 90 in the conventional manner. The lower end of shaft 34 of the crank 36 is journaled in the valve plate 76.

FIGS. 1 and 3 show the pivotal connection of the flag rod 92 to the diaphragm bracket 94 carried by the diaphragm plate 96. The flag rods 92 are each disposed on the inside of the diaphragms 68 and journaled in the valve plate 76 at the end thereof adjacent the outlet passage 90. The reciprocal movement of the diaphragm 68 will cause the flag rod 92 to oscillate. A valve linkage mechanism 98 is a pair of the valve means 26 and includes the flag rods 92 and the separate linkage means associated with each of the flag rods 92. Each of the linkage means is a mirror image of the other so that the same reference characters will identify the like parts thereof shown in FIGS. 1—4 and 8. Accordingly, flag arms 100 are affixed to and oscillated by the flag rods 92. The flag arms 100 includes a long flag arm 102 affixed at one end to the flag rod 92 and a short flag arm 104 pivotally connected to the other end of the long arm 102. The free end of the short arm 104 is pivotally connected to an eccentric 106 of a crank pin 108 formed on a crank arm or web 110 carried by crankshaft 34, as illustrated in FIGS. 6, 7 and 8, for purposes more fully explained hereinafter. The crankpin 108 and the eccentric 106 combine to define a duplex crankpin. Valve arms 112 are disposed immediately below the flag arms 100. The valve arms 112 have a long arm and a short arm 114 and 116, respectively, of substantially equal length to the long and short flag arms 102 and 104. The long valve arm 114 is pivotally connected at one end to the flag rod 92 and at the other end to the short valve arm 116. The free end of the short valve arm 116 is pivotally connected to the crankpin 108. The long valve arm 114 has an extension 118 bent in the direction of the opposite flag rod 92 to which it is connected for pivotally connecting said arm 114 to a projecting arm 120 formed integrally on the transfer valve members 78 and 80. The flag rod 92 is connected to be actuated by the diaphragm opposite the respective side-by-side transfer valve members 78 or 80. To this end the long flag arms 102 cross over each other, as do the long valve arms 114.

In operation gas from the gas line 54 enters the housing 22 through the inlet 50 to the interior space thereof to be admitted to one or more of the pairs of measuring chambers 24 depending on the respective position of the transfer valve members 78 and 80. The flow of gas through the measuring chambers 24 will be controlled by the reciprocating transfer valve members 78 and 80. The valve members 78 and 80 have their respective center sections connected at all times to the outlet passage 90 and alternately connected to one of the pair of valve ports 72 on either side of the diaphragms 68. The transfer valve members 78 and 80 are reciprocated by the valve arms 112 so that the gas is alternately admitted to the chamber portions 70 on one side of the diaphragm 68 and then the other side thereof, whereby the diaphragm 68 will alternately expand to expel gas from the opposite chamber portion 70. The gas being discharged from the chamber portion 70 will pass out the port 72 and through the discharge passage 90 to the outlet 52. The reciprocating motion of the diaphragm 68 is transmitted through the oscillation of the flag rods 92 to actuate the valve means 26 in a predetermined operative sequence.

Figures 9A, 9B, 9C, 9D:
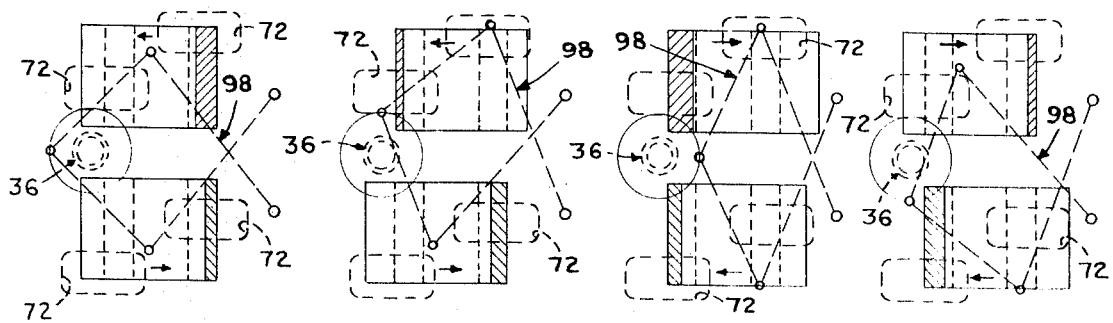
FIGS. 9a, 9b, 9C and 9d are diagrammatic top plan views of a simplified valve means showing the valve means in various positions during one complete rotation of the crank.

As indicated generally in FIGS. 9a, b, c and d, the motion of the transfer valve members 78 and 80 are substantially 90° out of phase with each other. In this manner one of the flag rods 92 is always being oscillated by the respective diaphragm 68 so as to continuously rotate the crank 36 in one direction, which in the present instance is assumed to be counterclockwise. In other words, the diaphragms 68 oscillate the flag rod 92 which through the flag arms 100 rotate the crank 36 to in turn drive the valve arms 112 and cause the valve members 78 and 82 to be reciprocated in operative sequence.

Figure 12:
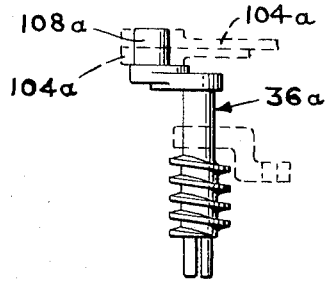
FIG. 12 is a front elevational view of the crank of the modified form of the present invention.
Figure 11:
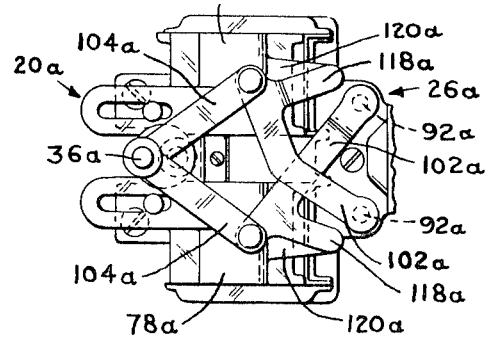
FIG. 11 is a top plan view showing the valve means of a modified form of the present invention.
Figure 13:
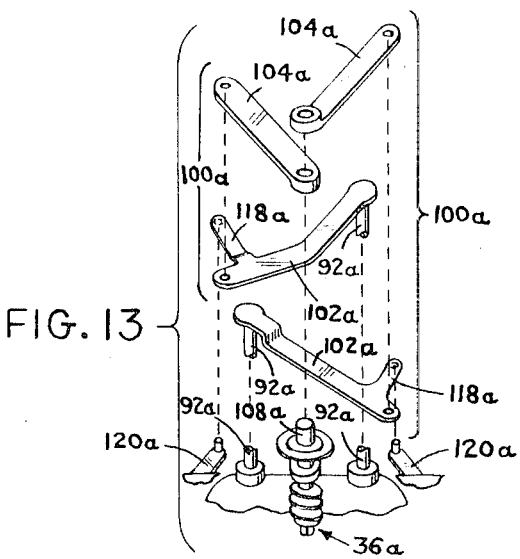
FIG. 13 is an exploded perspective view of the valve means shown in FIG. 11.

In the absence of the valve arms 112 the valve members 78 and 80 would be driven directly by the flag arms 100, as is shown in the modified embodiment of the invention of FIGS. 11, 12 and 13, in which the flag arms have been designated generally as 100a. Each of the flag arms 100a is affixed to a vertical flag rod 92a journaled to be oscillated by one of the diaphragms. The flag arms 100a include a long flag arm 102a that cross over each other and pivotally connect to a short flag arm 104a. The free end of the short flag arm 104a is pivotally connected to a crankpin 108a of a single throw crank 36a which is journaled to be rotated about a fixed axis responsive to the oscillations of the flag rods 92a. The long flag arms 102a each have extensions 118a bent in the direction of the opposite flag rod 92a to which it is connected for pivotally connecting said arm 102a to a projecting arm 102a formed integrally on the transfer valve members 78a and 80a. The operation of the gas meter 20a will be similar to that of gas meter 20 except that the valve means 26a has no provision for advancing the valve timing.

Figure 10:
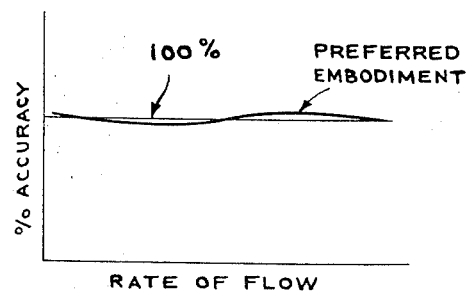
FIG. 10 is a diagrammatic representation of an accuracy curve for a gas meter embodying the preferred form of the present invention which is provided with means for advancing the valve timing.
Figure 14:
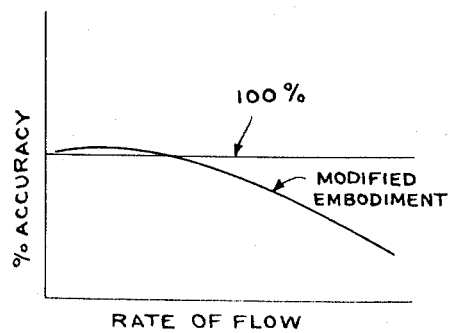
FIG. 14 is a diagrammatic representation of an accuracy curve of the modified form of the present invention which is not provided with means for advancing the valve timing.

This construction provides for the compact arrangement in that the valve means 26a are arranged on one side of the measuring chambers 24a with the transfer valve members 78a and 80a in side-by-side relation, a manner similar to that shown the preferred embodiment depicted in FIGS. 1—10. However, the modified embodiment of the invention of FIGS. 11, 12 and 13 is much more limited in the rate of flow. This is apparent from a comparison of the respective accuracy curves, in which FIG. 10 represents the preferred embodiment and FIG. 14 represents the modified embodiment. The preferred embodiment includes provision for an advance of the valve timing of the valve means 26 at the crank 36, as more fully explained hereinafter. The modified embodiment has no provision for advance of the valve timing and therefore the acceptable rate of flow therein will be one-fourth or less than that of the preferred embodiment.

In the modified form of the invention of FIGS. 11—13 as well as other conventional meters of this type, the diaphragm and the valve it drives have the same timing or position with reference to their strokes. This results in an increasing underregistration as the rate of flow increases and limits the capacity within a reasonable error of measurement. Conventional meters compensate for the tendency to underregister by the use of a double throw crank with the respective connection thereto, commonly at 135° to each other. One connection to the flag arms carries an adjustable tangent to set the valve timing by adjusting the tangent pivot. The other connection to the valve arms is usually nonadjustable, since the tangent adjustment will be sufficient to alter the valve timing as desired.

In the preferred embodiment, provision has been made to advance the valve timing with reference to the diaphragms 68, and thus, obtain high capacities without underregistration at increased rates of flow as shown in FIG. 10. The valve linkage mechanism 98 has the superpositioned pairs of flag arms 100 and valve arms 112 interconnected between the crank 36 an the respective flag rods 92. As illustrated in FIGS. 6 and 7 the crank 36, which will be rotated counterclockwise about the axis of the crankshaft 34, has a single throw or crank arm 110 upon the outer end of which is formed the duplex crankpin which includes the eccentric 106 and the crankpin 108. The crankpin 108 has the eccentric 106 form on the side thereof adjacent the trailing edge with respect to the direction of rotation. In the present instance, the crank 36 rotates counterclockwise, and therefore, the eccentric 106 is formed on the left side of the crankpin 108, as viewed in FIG. 6. Since this places the pivotal connection of the flag arms 100 closer to the trailing edge of the crankpin 108 than the pivotal connection of the valve arms 112, the effect is to advance the valve arms 112 travel relative that of the flag arms 100. In other words, the transfer valve members 78 and 80 are reciprocated in advance of the diaphragms 68. The advance in the valve timing can be set by the amount of relative eccentricity at the crank 36 connection of the flag arms 100 and valve arms 112 so as to prevent underregistration of the gas meter 20. In this manner, a substantially constant accuracy curve is obtained for the full range of design capacities and the gas meter can be operated at increased rates of flow without fear of underregistration.

It will be understood that various changes in the details, materials, arrangements of parts and operating conditions which have been herein described and illustrated in order to explain the nature of the invention may be made by those skilled in the art within the principles and scope of the invention.

I claim:

1. In a gas meter, a housing having an inlet and an outlet passage, a first and a second pair of measuring chambers, a first and a second valve disposed atop one side of the measuring chambers in side-by-side relationship to communicate the measuring chambers alternately to the inlet and the outlet passages, a register to indicate the quantity of gas passing through the meter, and a valve-actuating means comprising:
   a. a pair of flag rods reciprocally actuated by the measuring chambers,
   b. a pair of flange arms folded over each other,
   c. each of the flag arms including two pivotally connected arms,
   d. each of the flag arms having one arm thereof fixedly connected to one of the flag rods,
   e. a duplex crank means including a crankshaft journaled in the housing to rotate continuously in one direction about a fixed axis, a crank arm extending from the crankshaft and a duplex crankpin formed on the crank arm remote from the crankshaft,
   f. the duplex crankpin having a flag pin section and a valve pin section with the axis of each of the said sections on a different radial line from the axis of rotation of the crankshaft and a predetermined radial distance therefrom,
   g. a pair of valve links pivotally connected between the valve pin section of the duplex crankpin and the valves,
   h. the flag pin section of the crankpin offset from the valve pin section thereof,
   i. the flag arms having the other arm thereof pivotally connected onto the flag pin section of the duplex crankpin continuously to rotate the duplex crank means and produce an advance in the valve timing.

2. The combination claimed in claim 1 wherein:
   a. the axis of the valve pin section of the duplex crankpin is leading and the axis of the flag pin section of the duplex crankpin is trailing with respect to the direction of rotation, whereby the valve links are always moved by the duplex crank means in advance of the flag arms.

3. In a gas meter, a housing having an inlet and an outlet passage, a first and a second pair of measuring chambers, a first and a second valve to communicate the measuring chambers alternately to the inlet and the outlet passages, a register to indicate the quantity of gas passing through the meter, and a valve-actuating means for each of the valves comprising:
   a. a linkage mechanism operatively connected between the measuring chambers and the valves,
   b. a crank journaled in the housing and connected to be continuously rotated in one direction about an axis responsive to actuation of the linkage mechanism by the measuring chambers,
   c. the linkage mechanism includes a pair of flag rods, a pair of flag arms and a pair of valve links,
   d. the pair of flag rods are disposed on one side of the housing, remote from the crank and in spaced relation to each other, with one flag rod reciprocally actuated by first measuring chamber and the other flag rod reciprocally actuated by the second measuring chamber,
   e. the pair of flag arms are fixedly connected to one or the other of the flag rods and are each pivotally connected to the crank to rotate the same,
   f. each of the flag arms include a long arm and a short arm pivotally connected to each other,
   g. the long flag arms are disposed to cross over each other,
   h. the pair of valve links pivotally connected between the crankpin and the valves,
   i. each of the valve links includes a long arm, a short arm and a valve engaging arm which engages the adjacent valve and reciprocates the same,
   j. the long valve arms are pivotally connected to the short valve arms and cross over each other to pivotally connect to the flag rod,
   k. the crank includes a duplex crankpin having a flag arm section to which the flag arms are pivotally connected and a valve link section to which the valve links are pivotally connected,
   l. the axis of the flag arm section and the axis of the valve link section each formed on the duplex crankpin in spaced relation to each other with the axis of the valve link section disposed in advance with respect to the direction of rotation of the crank of the axis of the flag arm section, whereby the valve timing is advanced to permit greater meter accuracy at increased rates of flow.

4. The gas meter claimed in claim 3 having a housing of rectangular plan, the first and the second valves reciprocable lengthwise, in plan, and respectively associated with the first and the second pairs of measuring chambers, and wherein:
   a. each of the flag rods reciprocally actuated by the adjacent measuring chamber,
   b. each of the flag rods respectively connected through the flag arms, crank and valve links to actuate the valve controlling the flow of gas for the opposite measuring chamber.

5. The combination claimed in claim 4 wherein:
   a. each of the respective long flag arms and the long valve arms are of equal length and are placed in spaced relationship one over the other,
   b. each of the respective short flag arms and the short valve arms are of equal length and are placed in spaced relationship one over the other, on the same plane as the respective long flag arms and the long valve arms to which they are pivotally connected,
   c. the pair of short flag arms and the pair of short valve arms stacked in respective pairs upon the crankpin with said valve arms leading and the flag arms trailing in respect to the direction of crank rotation.

6. The combination claimed in claim 5, wherein:
   a. each of the valve engaging arms disposed remote from the crank and adjacent to one of the flag rods.

7. The combination claimed in claim 6 wherein:
   a. the crank disposed on a disposed on a hypothetical longitudinal line of the plan,
   b. the flag rods journaled in the housing crosswise of the last-mentioned hypothetical line in side-by-side relationship to each other,
   c. each of the valve engaging arms disposed outwardly of the respective adjacent flag rod to reciprocally actuate the valve on its side of the last-mentioned hypothetical line.

8. The combination claimed in claim 7 wherein:
   a. said valve-actuating means disposed in plan within one half side of the housing.

9. In a gas meter, a housing of rectangular plan having inlet and outlet passage, a first and a second pair of measuring chambers, a first and a second valve reciprocal in plan lengthwise of the housing and operatively associated with the respective first and second pairs of measuring chambers to communicate the measuring chambers to the inlet and outlet passages, valve-actuating means actuated from the measuring chambers to operate each of the valves in a predetermined sequence, a register driven from the valve-actuating means to indicate the quantity of gas being metered, said valve-activating means comprising:
   a. first and second flag rods operatively connected in the respective first and second pairs of measuring chambers to reciprocate thereby,
   b. first and second pairs of linkage means including pivotally connected links,
   c. one of the links of each of the first and second pairs of linkage means connected respectively to the first and the second flag rods, with one of the pairs of linkage means links being affixedly connected thereto, and with the other of the pairs of the linkage means links being pivotally connected thereto,
   d. a crank journaled in the housing to rotate about a fixed axis, e. a duplex crankpin means having a first pin section and a second pin section formed thereon, with the first pin section and the second pin section offset from each other, f. the duplex crankpin means has the other of the links of the first pair of linkage means pivotally connected to one of the pin sections and the other of the links of the second pair of linkage means pivotally connected to the other of the pin sections whereby upon the crank being rotated responsive to the reciprocal movement of the flag rod, one pair of linkage means will be leading and one pair of linkage means will be trailing, and g. a lever formed on each of the pivoted linkage means pivotally connected to reciprocate the respective first and second valves in the predetermined sequence.

10. The combination claimed in claim 9 wherein:

a. the duplex crankpin means for pivotally connecting the other of the links of the first and the second pairs of linkage means having the circumference of one of the pin sections lying within the circumference of the other of the pin sections with the axes thereof in offset relationship to each other, b. the other of the links of the first and second pivotal linkage means pivotally connected to one of the pin sections, c. the other of the links of the first and second fixed linkage means pivotally connected to the other pin section to continuously rotate the crank responsive to the reciprocal movement of the flag rods.

11. The combination claimed in claim 10 wherein:

a. the second pin section of the duplex crank pin means has its axis forwardly of the axis of the first pin section thereof with respect to the direction of rotation of the crank means, b. the other of the links of the crankpin second pivoted linkage means connected to the second pin section, c. the other of the links of the first and second fixed linkage means connected to the first pin section.

12. The combination claimed in claim 11 wherein:

a. the first and second fixed linkage means, and the first and second pivoted linkage means being of substantially identical length.

13. The combination claimed in claim 12 wherein:

a. the first and second pairs of linkage means includes a first and second link pivotally connected to each other, intermediate the flag rod and the duplex crankpin means.

14. In a gas meter, a housing having an inlet and an outlet passage, at least one pair of measuring chambers having a diaphragm therebetween, a valve operatively connected to communicate each measuring chamber to the inlet and the outlet passages, a valve-actuating means for the valve diaphragm activated, a register operatively connected to the valve-actuating means to indicate the quantity of gas passing through the meter, said valve-actuating means comprising:

a. a flag rod journaled in the housing to be reciprocated by the diaphragm, b. a pair of flag arms pivotally connected to each other with one affixed to be reciprocated by the flag rod, c. a pair of valve arms pivotally connected to each other, with one pivotally connected to the flag rod, d. the pairs of flag arms and valve arms of equal length and one pair disposed in superposition to the other pair, e. a crank means journaled in the housing, f. the free end of each of the pairs of flag arms and valve arms pivotally connected to the crank means in offset relationship to each other, and with the valve arm connected thereto to be shifted in advance of the flag arm to produce an advance in the valve operation, and, g. a valve link formed on one of the valve arms to connect the valve thereto to operate the same in a predetermined sequence responsive to the reciprocation of the flag rod.